April 6, 1965 M. H. GROSS 3,177,443

ARRANGEMENT FOR AUTOMATICALLY PROVIDING FREQUENCY EQUALITY BETWEEN TWO GIVEN SIGNALS

Filed March 21, 1962 6 Sheets-Sheet 1

INVENTOR

Michael Hubert Gross

BY Baldwin & Wight

ATTORNEYS

April 6, 1965 M. H. GROSS 3,177,443

ARRANGEMENT FOR AUTOMATICALLY PROVIDING FREQUENCY EQUALITY BETWEEN TWO GIVEN SIGNALS

Filed March 21, 1962 6 Sheets-Sheet 2

INVENTOR

Michael Hubert Gross

BY

Baldwin & Wight

ATTORNEYS

INVENTOR
Michael Hubert Gross
BY Baldwin & Wight
ATTORNEYS

INVENTOR
Michael Hubert Gross
BY Baldwin & Wight
ATTORNEYS

INVENTOR
Michall Hubert Gross
BY Baldwin & Wight
ATTORNEYS

INVENTOR:
Michael Hubert Gross
BY: Baldwin + Wight
ATTORNEYS 3,177,443
Patented Apr. 6, 1965

3,177,443

ARRANGEMENT FOR AUTOMATICALLY PROVIDING FREQUENCY EQUALITY BETWEEN TWO GIVEN SIGNALS

Michael Hubert Gross, Cowplain, Hants, England, assignor to The Marconi Company Limited, a British company Filed Mar. 21, 1962, Ser. No. 181,298
Claims priority, application Great Britain, Mar. 28, 1961, 11,327/61
5 Claims. (Cl. 331—12)

Figures 1, 6:
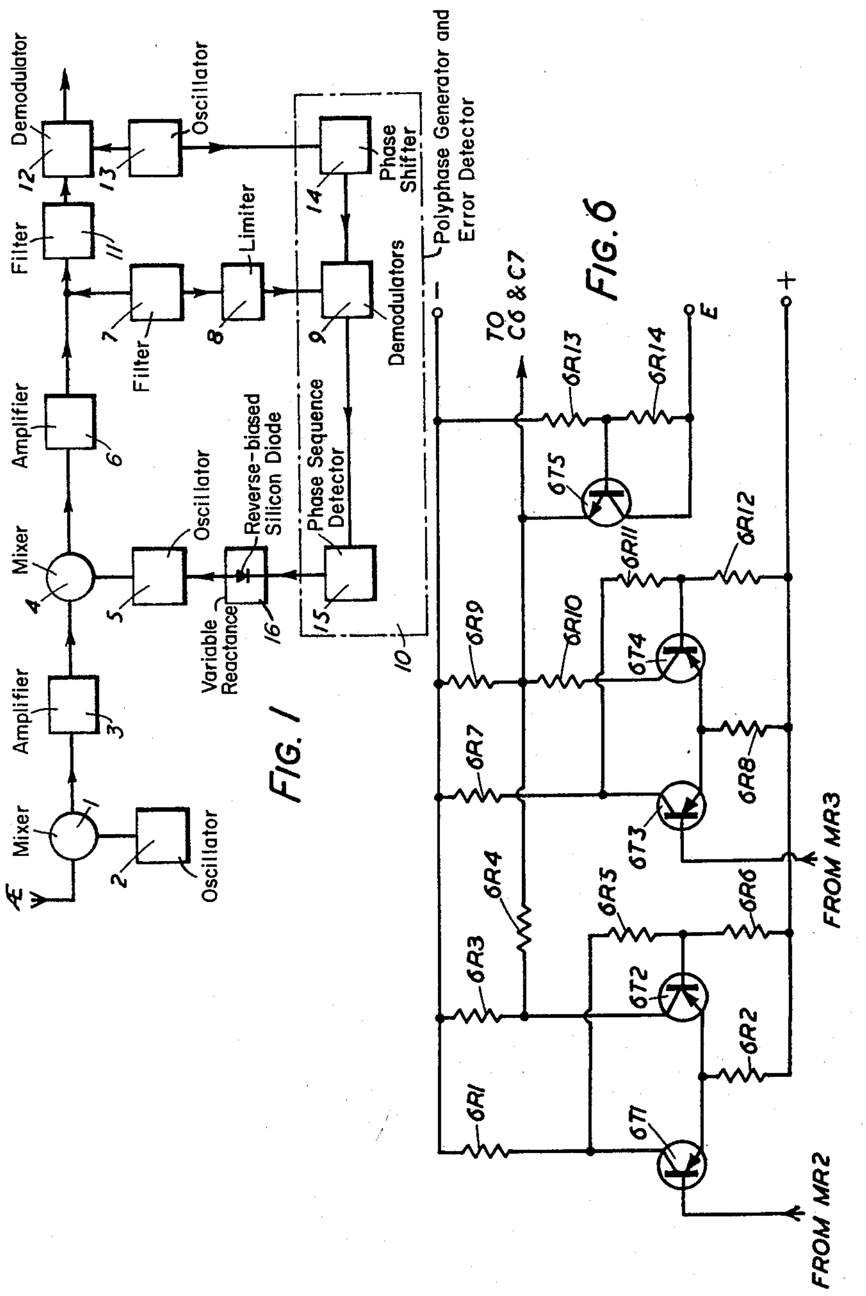

This invention relates to automatic frequency control arrangements and more particularly, although by no means exclusively, to such arrangements for use in pilot carrier, single sideband receiving systems for accurately maintaining the frequency of locally generated oscillations in registration with the frequency of the pilot carrier.

In such receiving systems it is a requirement for satisfactory reproduction of, for example, music that the locally generated oscillations be maintained in frequency within about ±2 cycles/sec. of their theoretically ideal value. This onerous requirement has been met in a known pilot carrier, single sideband receiving system by mixing the received radio frequency (R.F.) signals (or signals derived therefrom) with locally generated oscillations to provide intermediate frequency (I.F.) signals, demodulating the I.F. signals by means including a reference frequency oscillator and controlling, in dependence on the phase difference between the I.F. signal and that from the reference oscillator, a variable reluctance motor which drives a variable reactance included in a frequency determining circuit of the generator for the local oscillations to bring the frequency of the I.F. signal and that from the reference oscillator into coincidence. This arrangement suffers from the defects, however, that the so-called "pull-in" range (or "capture" range as it is perhaps more usually called) of the system is limited by the maximum frequency (corresponding to the difference in frequency between the I.F. and the reference oscillator) at which the motor will start and that the motor together with its associated mechanical equipment is costly and complex and, by virtue of its complexity, less reliable than the electronic equipment of the system.

It is the object of the present invention to provide improved automatic frequency control arrangements which are free of the above-mentioned defects and which are capable of satisfying the above-mentioned onerous requirement.

According to this invention an automatic frequency control arrangement for bringing two given signals into, and maintaining them at, close frequency equality comprises means for translating one of said given signals into a polyphase given signal having at least two phases which are not in phase opposition, means for combining each of the phases with the other given signal to produce a corresponding polyphase error signal having at least two phases which are not in phase opposition and means for utilizing said polyphase error signal to apply correction to the frequency of one of said given signals to bring it into, and maintain it at, close frequency equality with the other given signal, said last-mentioned means including means responsive to the relative magnitude of the phase delay with which a predetermined one of said two phases of the polyphase error signal follows the other for determining the sense of the applied correction.

According to a feature of this invention an automatic frequency control arrangement for bringing two given signals into, and maintaining them at, close frequency equality comprises means for translating one of said given signals into a polyphase given signal of three phases, means for combining each of the phases with the other given signal to produce a corresponding polyphase error signal and means for utilizing said polyphase error signal to apply correction to the frequency of one of said given signals to bring it into, and maintain it at, close frequency equality with the other given signal, said last-mentioned means including means responsive to the order in which the phases of the polyphase error signal pass through a predetermined amplitude for determining the sense of the applied correction.

Preferably the predetermined amplitude is zero amplitude.

According to a second feature of this invention an automatic frequency control arrangement for bringing two given signals to, and maintaining them at, close frequency equality comprises means for translating one of said given signals into a polyphase given signal having at least two phases, means for independently mixing each phase of said polyphase signal with the other given signal to provide a corresponding polyphase, difference frequency, error signal, a condenser, means for varying the charge on the condenser in dependence on the order in which the phases of said error signal pass through a predetermined amplitude, said charge being varied in one direction when the phases of the error signal pass through said predetermined amplitude in one order and in the other direction when said phases of the error signal pass through said predetermined amplitude in the other order, and means responsive to the charge on the condenser for correcting the frequency of one said given signals to bring it into, and maintain it at, close frequency equality with the other. Preferably said predetermined amplitude is zero amplitude.

Preferably the means for varying the charge on the condenser comprises means, fed with the phases of said error signals and adapted to provide, at any one time, one of three output signals of different predetermined values in dependence on which phase of said error signal was last within a predetermined range of amplitudes and means, responsive to the maximum change in value of said output signal between successive values, for varying, in a direction dependent on the direction of said change, the charge on said condenser.

Preferably, the given signal is translated into a three phase given signal each phase of which is independently mixed with the other given signal to produce a three-phase difference frequency error signal, and there is provided a circuit arrangement including three electronic switch devices (e.g., transistors) each of which is connected to be switched to one of its switching states by a different one of the phases of said error signal to provide an output signal from said circuit arrangement whose value is characteristic of the switching of said device, the arrangement being such that only one of said devices is switched to said state at any one time.

Preferably there are provided means for differentiating said output signals, means for selecting from the differentiated signals the signals of highest amplitude and means for charging or discharging the condenser in dependence on the polarity of the selected signals.

Preferably, the means responsive to the charge on the condenser for controlling the frequency of at least one of said two signals comprises a variable reactance (e.g., a reverse-biased silicon diode) included in a frequency determing circuit of an oscillator controlling the frequency of one of said two signals.

The charge on the condenser may effect direct control of the variable reactance or, alternatively, may control the position of a motor (e.g., a simple split-field D.C. motor) adapted mechanically to drive the variable reactance to change its value.

In accordance with a subordinate feature of the invention, a pilot carrier single sideband receiving system comprises an automatic frequency control arrangement as above described; a local oscillator; means for mixing incoming signals, or signals derived therefrom, with signals from said local oscillator to provide intermediate frequency signals constituting one of the aforesaid two given signals which are to be brought to, and maintained at, close frequency equality; a reference oscillator providing the other of the aforesaid two given signals; and a demodulator fed with said intermediate frequency signals and signals from said reference oscillator and adapted to provide output modulation signals; the means responsive to the charge on the condenser, as above described, comprising means for controlling the frequency of said local oscillator.

Figure 2:
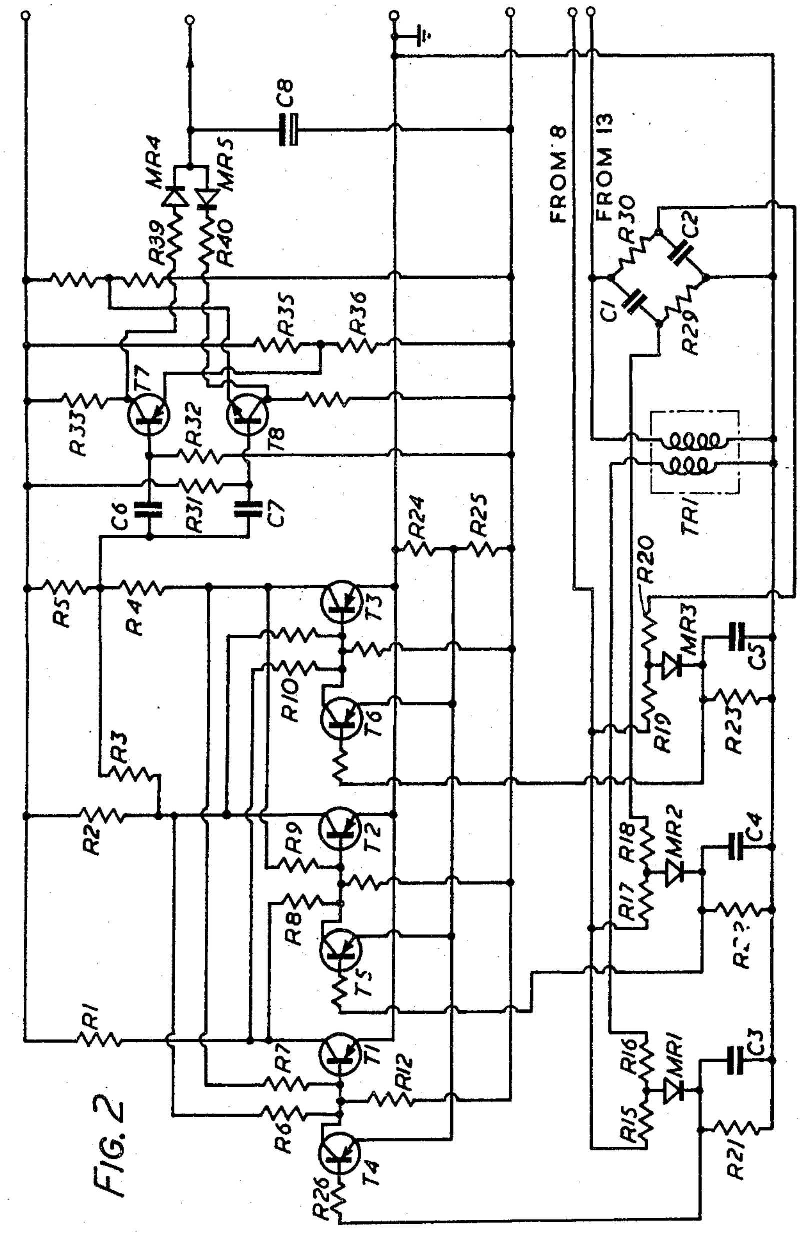
Figure 3:
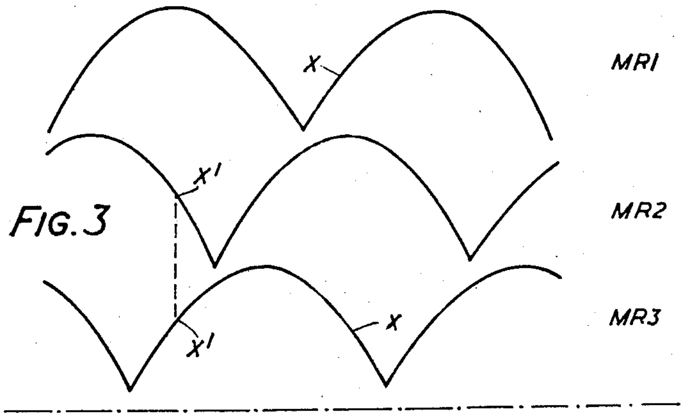
Figure 5A:
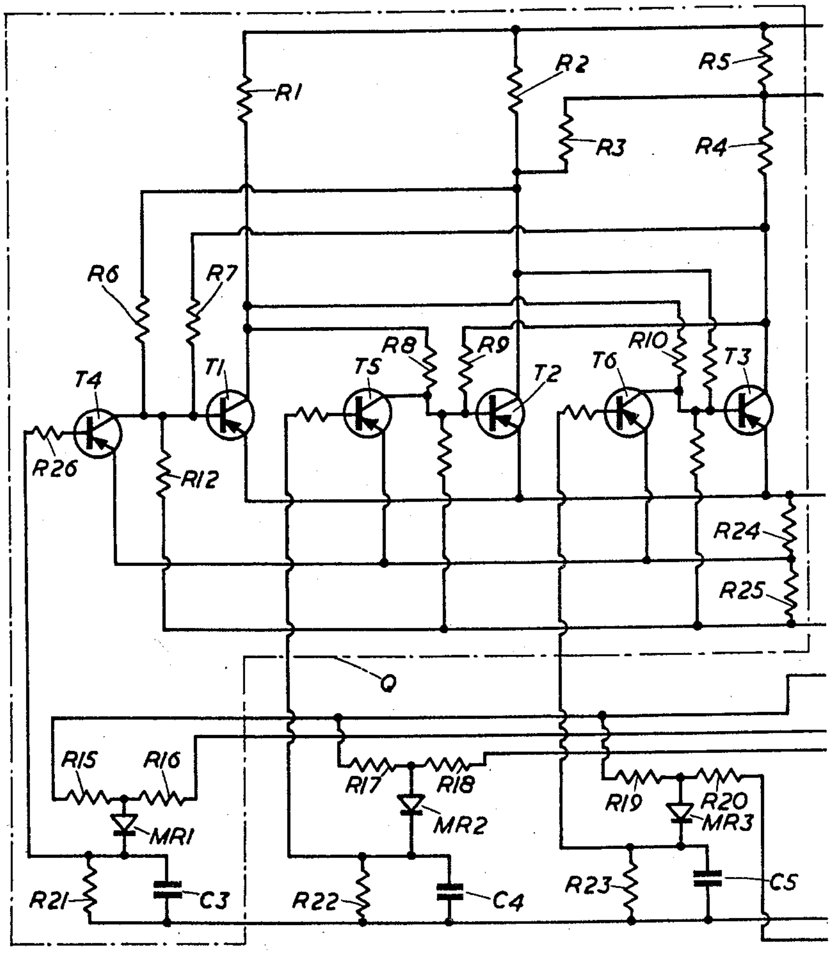
Figure 4:
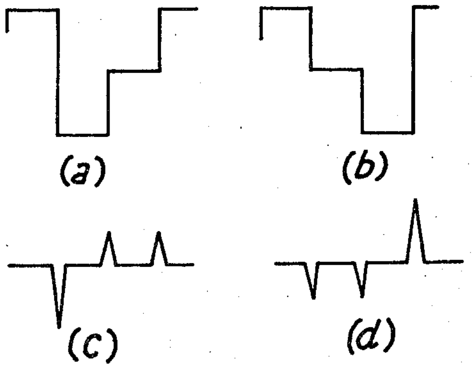
Figure 5B:
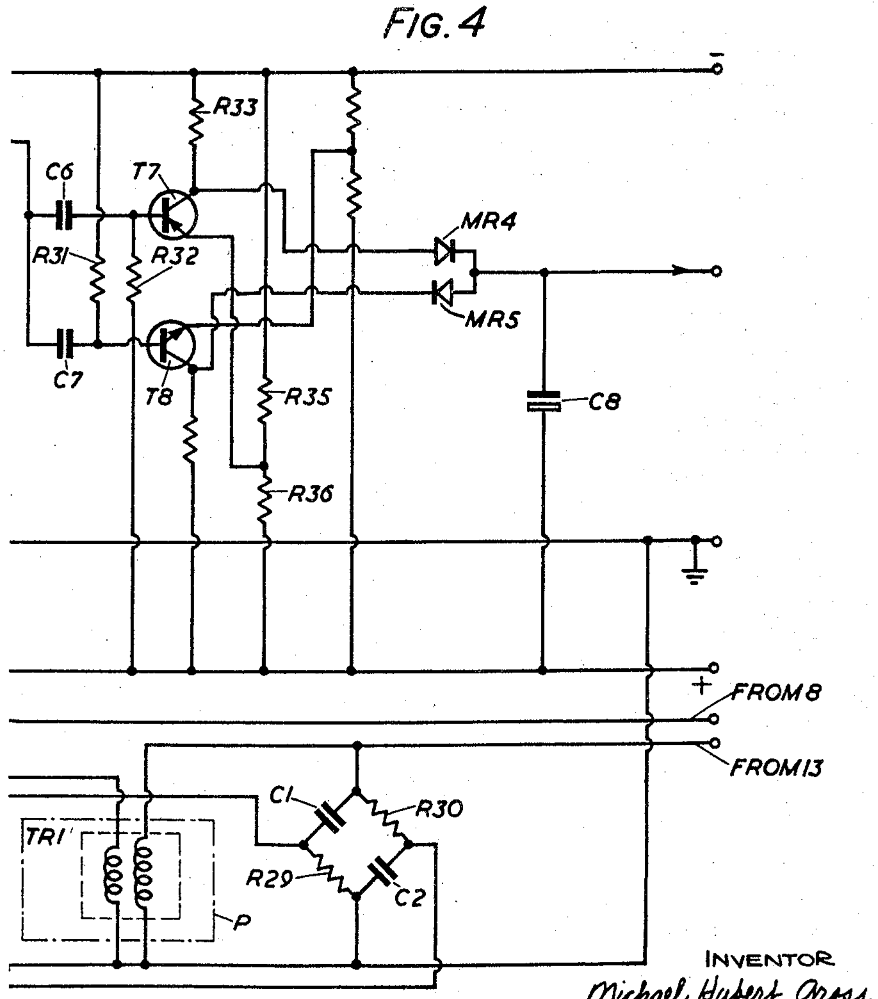
Figure 7:
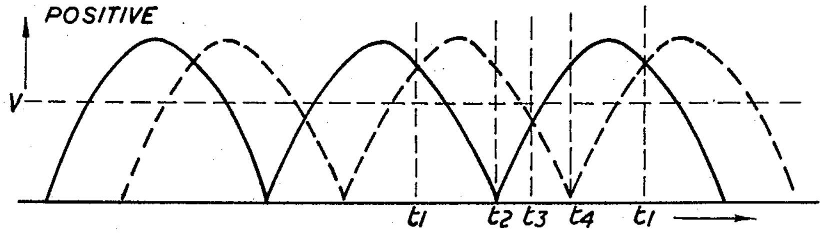
Figure 8:
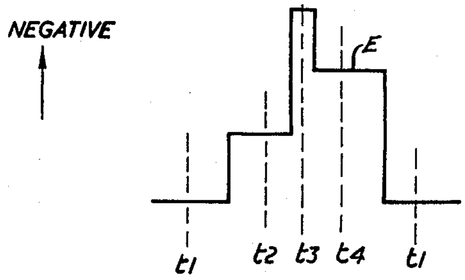
Figure 9:
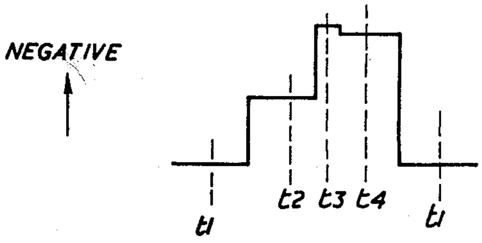
Figure 10:
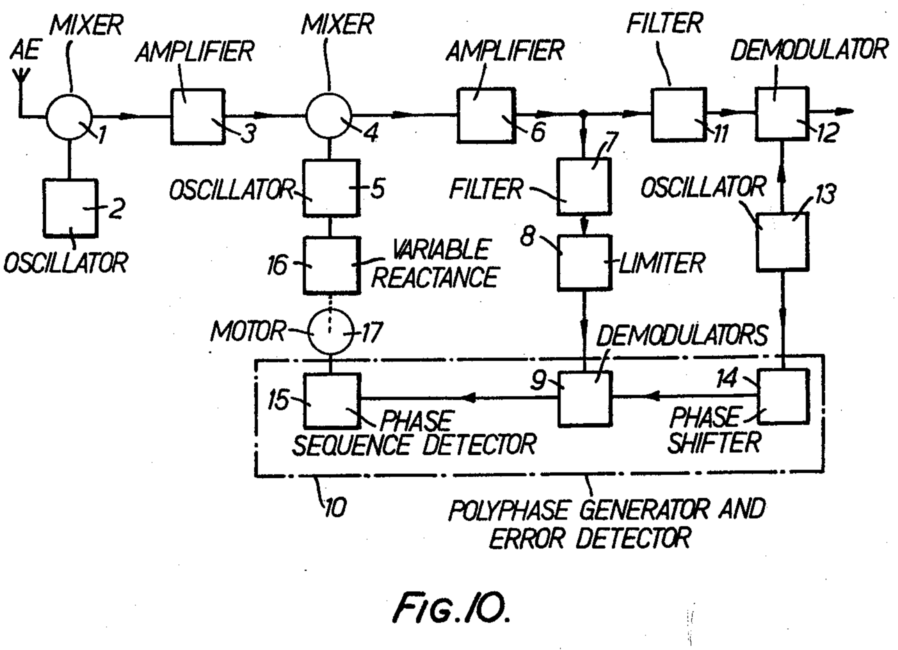

The invention is illustrated in and further described with reference to the accompanying drawings which are, for convenience of reference numbered consecutively. In the drawings FIGURE 1 illustrates in block diagram a pilot carrier, single sideband receiving system in accordance with the invention; FIGURE 2 is a circuit diagram of part of the arrangement of FIGURE 1; FIGURES 3 and 4 are explanatory graphical figures related to the arrangement of FIGURE 2; FIGURES 5A and 5B show a detail variant of the circuit of FIGURE 2; FIGURE 6 illustrates, so far as is necessary to an understanding thereof, one way in which the circuit of FIGURE 5 may be modified to transform it from three-phase operation to two-phase operation; FIGURES 7, 8 and 9 are explanatory graphical figures relating to the operation of the arrangement illustrated by FIGURE 6; and FIGURE 10 is a block diagram similar to that of FIGURE 1 but showing the variant in which an electric motor mechanically drives a variable reactance.

Referring to FIGURE 1, signals received on aerial AE and comprising single sideband signals together with a pilot carrier are applied to a first mixer 1 where they are mixed with oscillations from a first local oscillator 2 to provide output signals at the first I.F. (intermediate frequency) comprising a frequency corresponding to the pilot carrier frequency together with the modulation sidebands and which are subsequently amplified in amplifier 3 whose pass band is sufficiently wide to accommodate any expected variations in the frequency of the received signals. The output signals from amplifier 3 are applied to a second mixer 4 to which are also applied signals from a second local oscillator 5, mixer 4 providing output signals at the second I.F. which are subsequently amplified in amplifier 6. Output signals from amplifier 6 are applied to a filter 7 which is adapted to pass, once the automatic control of the frequencies has been established, only those signals corresponding to the carrier frequency and to exclude the sideband signals and the output from the filter 7 is subjected to amplitude limitation in limiter 8, the output of which is applied to the demodulator circuits 9 of unit 10, which is illustrated in greater detail in FIGURE 2.

Output from amplifier 6 is also applied to the sideband filter 11 which is adapted to pass only the sideband frequencies and to reject the signals corresponding to the carrier frequency, and the output from filter 11 is applied to a demodulator 12 which also receives reference oscillations from a reference oscillator 13. Demodulator 12 is adapted to provide output signals corresponding to the modulation on the original carrier signal which are fed to suitable utilization means (not shown). The reference oscillations from oscillator 13 are also fed to a phase shift network 14, also in unit 10, and the output therefrom is applied to the demodulators 9 whose output is, in turn, applied to the phase sequence detector 15. The output of the phase sequence detector 15 constitutes the output of the unit 10 and is applied to a variable reactance 16, which may be as known per se, and preferably comprises a reverse-biased silicon diode and which constitutes part of a frequency determining circuit of the second local oscillator 5. The arrangement is such that oscillator 5 is brought to a frequency of such value that the second I.F. is equal to the frequency of the oscillator 13, whereby the output from demodulator 12 is accurately representative of the modulation signals.

Referring to FIGURE 2, the output from oscillator 13 is applied to a phase shifting network comprising condensers C1 and C2 and resistances R29 and R30 and which is adapted to provide two signals from the junctions of C1 and R29 (on the one hand) and C2 and R30 (on the other hand) which are both displaced in phase from the input signal by 60° in opposite senses. The signals from oscillator 13 are also applied to transformer TR1 which is connected to produce an output of opposite phase to the input and of slightly reduced amplitude such that the output from transformer TR1 is equal in amplitude to the differently phased output signals from the phase shift network C1, C2, R29, R30, and displaced in phase by 120° therefrom. It will be seen that the three signals from the junction of C1 and R29, from the junction of C2 and R30 and from the secondary of transformer TR1 constitute the three phases of a polyphase signal. The three phases of the signals from oscillator 13 are each applied via resistances R16, R18 or R20 to one of the demodulator diodes MR1, MR2 or MR3. The second I.F. signals from filter 7 and limiter 8 of FIGURE 1, which are arranged to be of the same amplitude as the aforesaid differently phased signals, are applied via resistances R15, R17 and R19 to each of the demodulator diodes MR1, MR2 and MR3 whereby these three diodes each produces an output at a beat frequency equal to the difference in frequency between the I.F. signal from limiter 8 and the reference oscillations from oscillator 13. The smoothing circuits C3, R21; C4, R22 and C5, R23 provide that the output signals from MR1, MR2 and MR3 are smoothed, rectified sine waves displaced in phase from one another by 120° at the difference frequency, these three signals constituting three phases of a polyphase error signal. If desired, the diodes MR1, MR2 and MR3 may be operated as square law detectors in which case the output difference frequency signals therefrom will be sine waves. This, however, is not preferred.

The output signals from the three demodulators are illustrated in FIGURE 3, the references MR1, MR2 and MR3 being applied where appropriate. The case illustrated in FIGURE 3 is that in which the I.F. signal from limiter 8 is higher in frequency than the signals from oscillator 13 and it will be seen that in this case the order in which the three output signals reach their minimum value is MR1, MR3, MR2. It will be apparent that when the signals from oscillator 13 are higher in frequency than those from limiter 8 the above-mentioned sequence will be reversed and will thus be MR1, MR2, MR3.

The output signals from the three demodulators are applied to a tri-stable circuit comprising transistors T1, TR2 and T3 which are so connected that at any time two of the transistors are conductive and one is cut off. Each of the transistors T1, T2 and T3 has its emitter earthed, its collector connected through a resistive load to the negative supply terminal and its base connected, via a resistance, to the collectors of the other two transistors and also to the collector of a switching transistor T4, T5 or T6, to the bases of which are applied the outputs from MR1, MR2 and MR3, respectively, these connections operating to switch transistors T1, T2 and T3 in such manner that, as aforesaid, two of these last named transistors are conductive and one is cut off.

Considering transistor T4, its emitter, which is fed by means of the potentiometer comprising resistances R24 and R25 connected in series between earth and a positive supply terminal, is held at a small positive potential such that when its base is at a low potential, near that of earth, the transistor is conductive. The collector of transistor T4, which is, in turn, connected to the base of transistor T1 and which is connected to the negative supply terminal via circuits including R6 and R7 and to the positive supply terminal via resistance R12, is sufficiently positive to cut off transistor T1. When the potential applied from diode MR1 via resistance R26 to the base of transistor T4 exceeds a predetermined positive value, transistor T4 cuts off. The potential from diode MR1 at which transistor T4 cuts off is so chosen as to be less than the potential which, at the same moment, appears at either of the other diodes MR2 or MR3, and may, for example, be the potential occurring at the point X in FIGURE 3.

After transistor T4 has cut off and when the output from either MR2 or MR3 reduces to a value corresponding to the point X of FIGURE 3, the appropriate transistor T5 or T6 will conduct. In the case illustrated in FIGURE 3 the output from MR3 is next to reach the value X so that transistor T6 is rendered conductive. Its collector, and therefore the base of transistor T3, go positive causing transistor T3 to cut off. The collector of transistor T3 then goes negative thus applying a negative signal to the bases of transistors T1 and T2 via resistances R7 and R9, respectively. In response to this negative signal transistor T1 is rendered conductive and transistor T2, which is already conducting, remains unaffected.

After the output from MR3 passes through zero and again reaches the potential X transistor T6 is cut off. Subsequently transistor T5 is rendered conducting causing transistor T2 to be cut off and this, in turn causes transistor T3 to conduct and so on.

The collector loads of transistors T1, T2 and T3 are made up, as will be seen from the drawing, mainly of resistances R1, R2, R3, R4 and R5 which are so connected and so arranged in value, in accordance with well known principles, that there flows in resistance R5 substantially none of the collector current of transistor T1, substantially half of the collector current of transistor T2 and most of the collector current of transistor T3, whereby the potential of the junction of resistances R4 and R5 will vary in dependence on which two of the transistors T1, T2 and T3 are conductive at any given time.

FIGURE 4(*a*) shows the potentials existing at the junction of resistances R4 and R5 in the case illustrated in FIGURE 3. It will be seen that, at the moment when transistor T1 is cut off, the aforesaid junction point will be at its maximum potential and when transistor T1 becomes conductive and T3 is cut off this potential will drop to its minimum value. In the subsequent stages when transistors T1 and T3 are conductive and transistor T2 cut off, the potential will be at an intermediate value and when transistor T1 is again cut off and transistors T2 and T3 conductive, the potential will again rise to its maximum value.

FIGURE 4(*b*) shows the case in which switching around transistors T1, T2 and T3 is in the opposite sense.

The potential at the junction of resistances R4 and R5 is differentiated by the two differentiating circuits C6, R32 (on the one hand) and C7, R31 (on the other) to provide output pulses as illustrated in FIGURES 4(*c*) and (*d*), FIGURE 4(*c*) corresponding to FIGURE 4(*a*) and FIGURE 4(*d*) corresponding to FIGURE 4(*b*). It will be seen in FIGURE 4(*c*) that for each cycle of switching there are two low amplitude positive pulses and one high amplitude negative pulse, whereas in FIGURE 4(*d*) there are two low amplitude negative pulses and one high amplitude positive pulse. The output from differentiating circuit C6, R32 is applied to the base of a further transistor T7, whose emitter is positively biased to a potential a little less than that of the positive supply terminal by being connected to the potentiometer comprising resistances R35 and R36 connected in series between the positive and negative supply terminals and whose collector is connected via resistance R33 to the negative supply terminal. The connections of transistor T7 are such that the transistor is normally cut off and remains cut off except when the high amplitude negative pulses from the differentiating circuit are applied to its base.

Likewise, transistor T8, which is of the opposite polarity type to transistor T7, and which is similarly connected but in opposite sense, will remain cut off except when the high amplitude positive pulses from the differentiating circuit C7, R31 are applied to its base. The collector of transistor T7 is connected via diode MR4 to the negative terminal of condenser C8, which is preferably a tantalum electrolytic condenser, whose other terminal is connected to the positive supply terminal. If condenser C8 is not an electrolytic condenser the aforesaid other terminal may conveniently be connected to earth. Likewise, the collector of transistor T8 is connected to the diode MR5, connected in opposite sense to diode MR4, to the same terminal of condenser C8. In the normal case, in which which transistors T7 and T8 are both cut off, diode MR4 and MR5 are reverse biased and therefore present a very high impedance leakage path to the charge on condenser C8. When the sequence of switching of the tri-stable circuit comprising transistors T1, T2 and T3 is in one sense, however, e.g., that illustrated in FIGURE 4(*a*), transistor T7 is rendered periodically conductive whereby its collector goes positive, rendering diode MR4 conductive and causing condenser C8 to accumulate positive charge. When the sequence of switching of the tri-stable circuit is in the opposite sense, however, transistor T7 remains cut off and the transistor T8 is made periodically conductive whereby its collector is driven negative so that diode MR5 is rendered conductive and condenser C8 is discharged and/or caused to accumulate negative charge.

The voltage appearing across condenser C8 is the output voltage of the unit 10 of FIGURE 1 and is utilized to control the variable reactance 16 thereof.

It will be seen that when the frequencies of the signals from limiter 8 and oscillator 13 of FIGURE 1 reach equality the switching of the tri-stable circuit comprising transistors T1, T2 and T3 will stop, whereby condenser C8 is neither charged nor discharged, apart from any small leakage current flowing therefrom (neglecting the external load). The external load constituted by the variable reactance 16 of FIGURE 1, is preferably a reverse biased semi-conductor diode such as a silicon diode, which operates in well known manner as a capacitance whose value varies in accordance with the reverse biasing applied thereto. In this case the load on the condenser C8 is sufficiently small for the condenser C8 to maintain its charge for a considerable period.

The leakage of charge from condenser C8 is sufficiently small for the residual error in the system to be less than ±1 c./s. but in practice the frequency of the signals received on aerial 1 of the arrangement of FIGURE 1 will normally vary sufficiently rapidly for it to be relatively unimportant. Furthermore the leakage from condenser C8 is sufficiently small as to keep the receiver in tune within ±2 c./s. during normally encountered periods of fading of the received signal.

In practice it has been found that with an arrangement as described with reference to FIGURES 1 and 2 the receiver illustrated in FIGURE 1 will follow variations in the carrier frequency of the received signal with an error of less than one cycle per second.

The variable reactance 16 may, of course, be of suitable form and in a further, but not preferred, arrangement which is illustrated in FIGURE 10, the voltage across condenser C8 is used to drive a motor 17 such as a simple split field D.C. motor, which in turn mechanically controls any suitable form of variable reactance 16. In this case the discharge time constant of the condenser C8 should be comparatively short to avoid "hunting" and should, preferably, only be sufficiently long to smooth the pulses applied to the condenser. It will be seen that with this arrangement the motor 17 is a simple one and the arrangement does not suffer from the defect of a low "capture" range.

In the case illustrated in FIGURE 3 in which the frequency of unit 8 is higher than that of unit 13, ignoring the output signal from MR1, it will be seen that the output from MR3 lags that from MR2 by 240°. In the other case, in which the frequency of unit 8 is lower than that of unit 13, the output from MR3 lags that from MR2 by 120°. Hence the tri-stable circuit comprising the transistors T1, T2 and T3 and the following circuits constitute means, responsive to the relative magnitude of the phase delay with which one of the output signals from MR2 or MR3 follows the other, for determining the sense of the correction to be applied to the oscillator 5 of FIGURE 1.

In carrying out the invention it is not essential that one of the incoming signals from unit 13 or unit 8 be translated into a polyphase signal of three or more phases. A polyphase signal of only two phases, which are not in phase opposition may be produced and there may be only two demodulators. Thus the arrangement of FIGURE 5 may be modified by omitting the components of one phase, i.e., the components within the chain line P (and, of course, the leads thereto) and substituting for the tri-stable circuit arrangement within the chain line Q a circuit arrangement as shown in FIG. 6.

Referring to FIG. 6 the transistors 6T1 and 6T2 constitute, with their associated resistors, a Schmitt trigger circuit which is as well known per se and is designed to have as little "backlash" as possible and to switch when the input to the base of transistor 6T1 is of voltage V as shown in FIG. 7 which shows the voltage waveforms at the bases of transistors 6T1 and 6T3 if the two phases are at 120°, the full line curve being the voltage at the base of 6T1 and the broken line curve being that at the base of 6T3. The transistors 6T3 and 6T4 are connected in a similar Schmitt trigger circuit. At time $t_1$ (FIG. 7) transistors 6T1 and 6T3 are cut off; at time $t_2$ transistor 6T1 conducts, transistor 6T3 still being cut off; at time $t_3$ both transistors conduct; and at time $t_4$ transistor 6T1 is cut off and transistor 6T3 is conductive. Due to the Schmitt trigger action transistors 6T2 and 6T4 switch in opposite sense to trănisstors 6T1 and 6T3 respectively.

The collector loads of transistors 6T2 and 6T4 comprise the resistors 6R3, 6R4, 6R9 and 6R10 which are so connected and dimensioned that resistor 6R9 carries substantially the whole collector current of transistor 6T4 and substantially half the collector current of transistor 6T2. The potential at the junction point of the resistors 6R9 and 6R10 will therefore be one of four possible values depending upon whether only transistor 6T2 conducts or only transistor 6T4 conducts or both transistors conduct or neither conducts. FIG. 8 shows the wave form which will appear at the said junction point of resistors 6R9 and 6R10 if the effects of the further transistor 6T5 and the further resistors 6R13 and 6R14 be ignored.

The base of the further transistor 6T5 is held by the potentiometer comprising the further resistors 6R13 and 6R14 at a potential approximately equal to the potential E of FIG. 8. Accordingly, when the potential of the emitter of transistor 6T5 becomes negative with respect to the potential E, the said transistor will pass current and prevent the junction point of resistors 6R9 and 6R10 becoming appreciably negative with respect to the said potential E. Accordingly the wave form at the said junction point will be substantially as shown in FIG. 9. As will be apparent this wave form substantially corresponds to that shown in FIG. 4(*a*), and if applied to the junction point of the condensers C6, C7 (FIG. 5) will produce the required automatic frequency control voltage. Similarly, assuming an initial frequency difference of opposite sense and therefore an opposite sequence of phases, the wave form at the junction point of the resistors 6R9 and 6R10 will substantially correspond to that shown in FIG. 4(*b*).

I claim:

1. An automatic frequency control arrangement for bringing two given signals into, and maintaining them at, close frequency equality, said arrangement comprising a source of electrical power, means for translating one of said given signals into a three phase signal; a demodulator for combining each of the three phases with the other given signal to produce a corresponding three phase error signal; three switches, each controlled by a different one of the three phases of the error signal to be switched on and off once in each cycle so that one and only one switch is in a predetermined one of its two states at any one time; an impedance network connected to the switches and to said source of power to give an output signal of instantaneous amplitude peculiar to the switch which is instantaneously in said predetermined state; and control means responsive to the said output signal for automatically correcting the frequency of a preselected one of said given signals in a sense dependent upon the direction of the largest step in said output signal.

2. An automatic frequency control arrangement as claimed in claim 1, wherein the control means comprises a differentiator and a further switch connected to be controlled by the output of the differentiator, said further switch having a threshold control level lying between the largest and the next largest amplitude of pulses of a particular polarity produced by the differentiator in response to the steps of the said output signal from the impedance network.

3. An automatic frequency control arrangement as claimed in claim 2, wherein said further switch controls the sense of a unidirectional potential applied to control a variable reactance included in a frequency determining circuit of an oscillator controlling the frequency of said preselected one of said two given signals.

4. An automatic frequency control arrangement as claimed in claim 3, wherein said unidirectional potential controls the position of a motor adapted to drive the variable reactance.

5. An automatic frequency control arrangement as claimed in claim 2, wherein said further switch controls the sense of a unidirectional potential applied to control a reverse-biased silicon diode included in a frequency determining circuit of an oscillator controlling the frequency of said pre-selected one of said two given signals.

References Cited by the Examiner

UNITED STATES PATENTS

| | | | |
|---|---|---|---|
| 2,058,114 | 10/36 | Usselman | 331—12 |
| 2,104,801 | 1/38 | Hansell | 331—12 |
| 2,505,642 | 4/50 | Hugenholtz et al. | 331—36 X |

FOREIGN PATENTS

| | | |
|---|---|---|
| 642,757 | 9/50 | Great Britain. |

ROY LAKE, *Primary Examiner.*

JOHN KOMINSKI, *Examiner.*